(12) United States Patent
Barner et al.

(10) Patent No.: US 9,432,288 B2
(45) Date of Patent: Aug. 30, 2016

(54) SYSTEM ON CHIP LINK LAYER PROTOCOL

(71) Applicant: Cavium, Inc., San Jose, CA (US)

(72) Inventors: Steven C. Barner, Shrewsbury, MA (US); Craig A. Thomas, Sudbury, MA (US)

(73) Assignee: Cavium, Inc., San Jose, CA (US)

( * ) Notice: Subject to any disclaimer, the term of this patent is extended or adjusted under 35 U.S.C. 154(b) by 374 days.

(21) Appl. No.: 14/194,049

(22) Filed: Feb. 28, 2014

(65) Prior Publication Data

US 2015/0249602 A1  Sep. 3, 2015

(51) Int. Cl.
| | |
|---|---|
| *G06F 15/78* | (2006.01) |
| *H04L 12/803* | (2013.01) |
| *H04L 12/721* | (2013.01) |
| *H04L 12/713* | (2013.01) |
| *H04L 12/709* | (2013.01) |

(52) U.S. Cl.
CPC ........... *H04L 45/72* (2013.01); *G06F 15/7807* (2013.01); *H04L 45/245* (2013.01); *H04L 45/586* (2013.01)

(58) Field of Classification Search
CPC ..... G06F 15/807–15/7825; G06F 2213/0038; H04L 45/245; H04L 45/586
See application file for complete search history.

(56) References Cited

U.S. PATENT DOCUMENTS

| | | | |
|---|---|---|---|
| 8,560,757 B2 | 10/2013 | Pangborn et al. | |
| 2009/0083263 A1* | 3/2009 | Felch ................... | G06F 9/3851 |
| 2013/0103909 A1 | 4/2013 | Pangborn et al. | |
| 2013/0111141 A1 | 5/2013 | Kessler et al. | |
| 2014/0189094 A1* | 7/2014 | Ditya ................... | H04L 45/245 709/224 |

OTHER PUBLICATIONS

Yoon et al., Virtual Channels vs. Multiple Physical Networks—A Comparative Analysis, DAC'10, Jun. 13-18, 2010, Anaheim, California, p. 162-165.*

* cited by examiner

*Primary Examiner* — Hoon J Chung
(74) *Attorney, Agent, or Firm* — Hamilton, Brook, Smith & Reynolds, P.C.

(57) ABSTRACT

A network processing system provides coherent communications between multiple system-on-chips (SOCs). Data messages between SOCs are assigned to virtual channels. An interconnect linking the SOCs divides the communications into discrete data blocks, each of which contains data segments from several virtual channels. The virtual channels can be implemented to control congestion and interference among classes of communications. During transmission, the interconnect distributes the data blocks across several physical ports linking the SOCs. As a result, communications between SOCs is optimized with minimal latency.

28 Claims, 11 Drawing Sheets

SYSTEM ON CHIP LINK LAYER PROTOCOL

BACKGROUND

Typical network processors schedule and queue work such as packet processing operations for upper level network protocols, and allow processing with respect to upper level network protocols (e.g., transport and application layers) in received packets before forwarding the packets to connected devices. The functions typically performed by network processors include packet filtering, queue management and priority, quality of service enforcement, and access control. By employing features specific to processing packet data, network processors can optimize an interface of a networked device. A network processor can be implemented within a system-on-chip (SOC), which can contain several processing cores sharing a common set of resources within the SOC.

SUMMARY

Example methods and systems of the present invention provide for coherent communications between a number of system-on-chips (SOCs). In one embodiment, a data message is generated at a first SOC for transmission to a second SOC, where the first and second SOCs each include a cache and a plurality of processing cores. The data message is associated with one of a plurality of virtual channels. A data block is generated to include data associated with each of the plurality of virtual channels, and includes at least a portion of the data message. Segments of the data block are distributed across a plurality of output ports at the first SOC, and are then transmitted, via the plurality of output ports, to the second SOC.

In further embodiments, the data block may be one of a plurality of data blocks used to transmit the data message. As such, the plurality of data blocks may be generated each to include distinct portions of the data message. Each of the data blocks may be distributed across the output ports for transmission to the second SOC. Likewise, the data message may be one of a plurality of data messages, and each data block may include segments of each of the data messages.

In still further embodiments, the data block can be generated to include one or more segments storing an indicator to confirm that another data block was received correctly at the first SOC from the second SOC. A credit count may be maintained on a per-virtual channel basis at each SOC, which can increment and decrement the credit count in response to receiving or transmitting data blocks or credits that may be indicated within the data blocks. Transmittal of data blocks can be permitted based on an adequate respective credit count.

In yet still further embodiments, the data block may be stored to a retry buffer, which can be accessed in the event of an unsuccessful transmittal, or cleared in response to acknowledgement of a successful transmittal. In order to initialize communications, a first initialization block may be transmitted from the first SOC to the second SOC. Following a response from the second SOC, a second initialization block may be transmitted to the SOC before transmitting data blocks.

In still further embodiments, a system may include a plurality of linked SOCs. For example, a system may include first and second SOCs each having respective input/output (I/O) ports, caches, and a plurality of processors, and each are configured to generate data messages for transmission to another SOC. Each data message is associated with one of a plurality of virtual channels. An interface generates a data block to include data associated with each of the plurality of virtual channels, where the data block includes at least a portion of the data message. Further, the interface causes the data blocks to be transmitted between the first SOC and the second SOC via the I/O ports, where the interface distributes segments of the data block across the first set of I/O ports.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

Before describing example embodiments of the present invention in detail, an example network processor in which embodiments may be implemented is described immediately below to help the reader understand the inventive features of the present invention.

Figure 1:
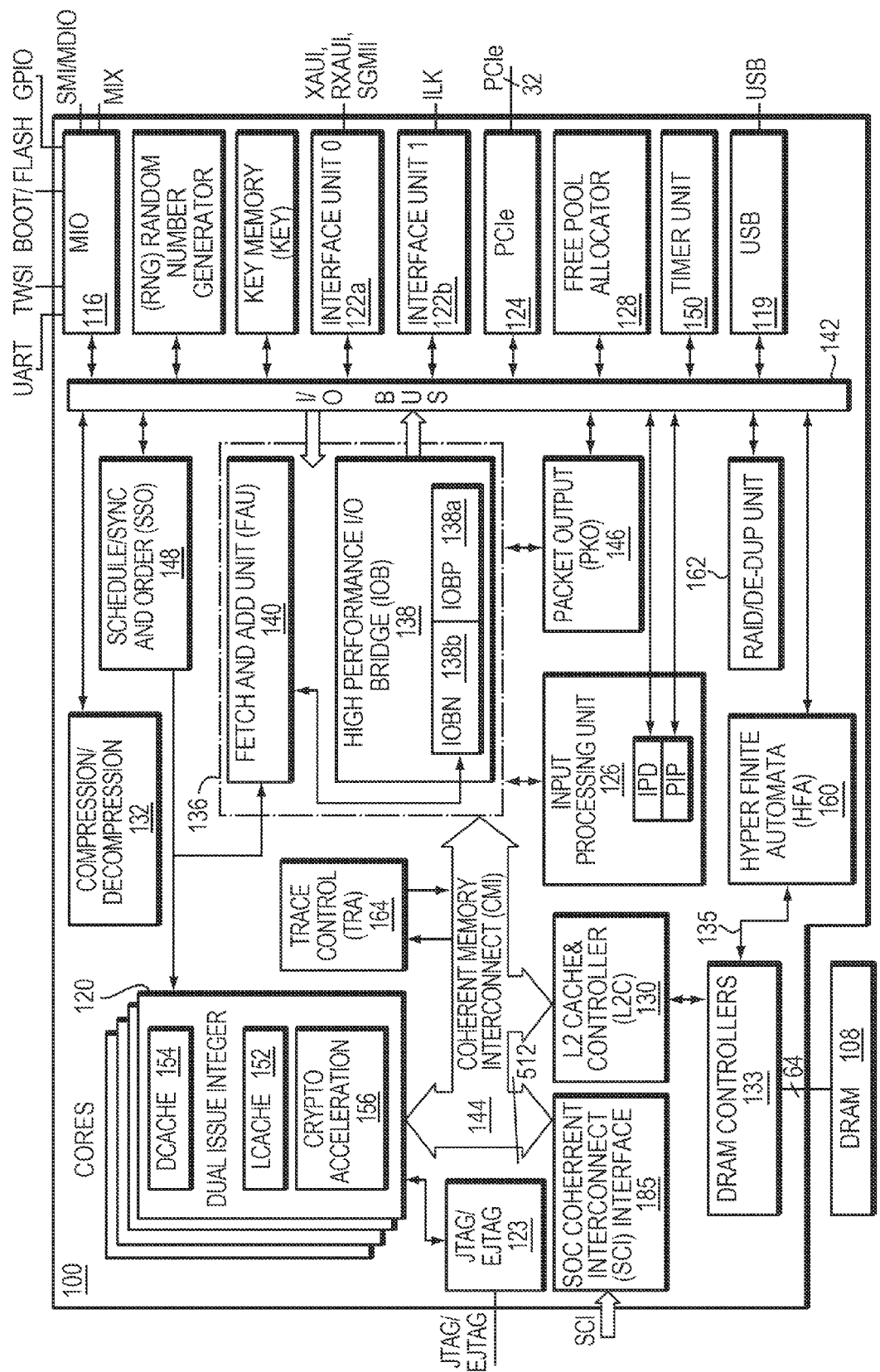
FIG. 1 is a block diagram illustrating a system-on-chip (SOC) network services processor in which embodiments of the present invention may be implemented.

FIG. 1 is a block diagram illustrating a network services processor 100. The network services processor 100 delivers high application performance using at least one processor core 120. The network processor 100 can be implemented within a system-on-chip (SOC), and can be a component of a multiple-SOC system linked by a coherent interconnect as described below with reference to FIG. 2.

The network services processor 100 processes Open System Interconnection network L2-L7 layer protocols encapsulated in received packets. As is well-known to those skilled in the art, the Open System Interconnection (OSI) reference model defines seven network protocol layers (L1-L7). The physical layer (L1) represents the actual interface, electrical and physical that connects a device to a transmission medium. The data link layer (L2) performs data framing. The network layer (L3) formats the data into packets.

The transport layer (L4) handles end to end transport. The session layer (L5) manages communications between devices, for example, whether communication is half-duplex or full-duplex. The presentation layer (L6) manages data formatting and presentation, for example, syntax, control codes, special graphics and character sets. The application layer (L7) permits communication between users, for example, file transfer and electronic mail.

The network services processor 100 may schedule and queue work (packet processing operations) for upper level network protocols, for example L4-L7, and allow processing of upper level network protocols in received packets to be performed to forward packets at wire-speed. Wire-speed is the rate of data transfer of the network over which data is transmitted and received. By processing the protocols to forward the packets at wire-speed, the network services processor does not slow down the network data transfer rate.

A packet is received for processing by a plurality of interface units 122. A packet can also be received by a PCI interface 124. The interface unit 122 performs pre-processing of the received packet by checking various fields in the L2 network protocol header included in the received packet and then forwards the packet to a packet input unit 126. At least one interface unit 122a can receive packets from a plurality of X Attachment Unit Interfaces (XAUI), Reduced X Attachment Unit Interfaces (RXAUI), or Serial Gigabit Media Independent Interfaces (SGMII). At least one interface unit 122b can receive connections from an Interlaken Interface (ILK).

The packet input unit 126 performs further pre-processing of network protocol headers (e.g., L3 and L4 headers) included in the received packet. The pre-processing includes checksum checks for TCP/User Datagram Protocol (UDP) (L3 network protocols).

A free-pool allocator 128 maintains pools of pointers to free memory in Level-2 cache memory 130 and external DRAM 108. The packet input unit 126 uses one of the pools of pointers to store received packet data in Level-2 cache memory 130 or external DRAM 108 and another of the pools of pointers to allocate work queue entries for the processor cores 120.

The packet input unit 126 then writes packet data into buffers in Level-2 cache 130 or external DRAM 108. Preferably, the packet data is written into the buffers in a format convenient to higher-layer software executed in at least one of the processor cores 120. Thus, further processing of higher level network protocols is facilitated.

The network services processor 100 can also include one or more application specific co-processors. These co-processors, when included, offload some of the processing from the cores 120, thereby enabling the network services processor to achieve high-throughput packet processing. For example, a compression/decompression co-processor 132 is provided that is dedicated to performing compression and decompression of received packets. Other embodiments of co-processing units include the RAID/De-Dup Unit 162, which accelerates data striping and data duplication processing for disk-storage applications.

Another co-processor is a Hyper Finite Automata (HFA) unit 160 which includes dedicated HFA thread engines adapted to accelerate pattern and/or signature matching necessary for anti-virus, intrusion-detection systems and other content-processing applications. Using a HFA unit 160, pattern and/or signature matching is accelerated, for example being performed at rates upwards of multiples of tens of gigabits per second. The HFA unit 160, in some embodiments, could include any of a Deterministic Finite Automata (DFA), Non-deterministic Finite Automata (NFA), or HFA algorithm unit.

An I/O interface 136 manages the overall protocol and arbitration and provides coherent I/O partitioning. The I/O interface 136 includes an I/O bridge 138 and a fetch-and-add unit 140. The I/O Bridge includes two bridges, an I/O Packet Bridge (IOBP) 138a and an I/O Bus Bridge (IOBN) 138b. The I/O Packet Bridge 138a is configured to manage the overall protocol and arbitration and provide coherent I/O portioning with primarily packet input and output. The I/O Bus Bridge 138b is configured to manage the overall protocol and arbitration and provide coherent I/O portioning with primarily the I/O Bus. Registers in the fetch-and-add unit 140 are used to maintain lengths of the output queues that are used for forwarding processed packets through a packet output unit 146. The I/O bridge 138 includes buffer queues for storing information to be transferred between a coherent memory interconnect (CMI) 144, an I/O bus 142, the packet input unit 126, and the packet output unit 146.

The miscellaneous I/O interface (MIO) 116 can include auxiliary interfaces such as General Purpose I/O (GPIO), Flash, IEEE 802 two-wire Management Interface (MDIO), Serial Management Interrupt (SMI), Universal Asynchronous Receiver-Transmitters (UARTs), Reduced Gigabit Media Independent Interface (RGMII), Media Independent Interface (MII), two wire serial interface (TWSI) and other serial interfaces.

The network services provider 100 may also include a Joint Test Action Group ("JTAG") Interface 123 supporting the MIPS EJTAG standard. According to the JTAG and MIPS EJTAG standards, a plurality of cores within the network services provider 100 will each have an internal Test Access Port ("TAP") controller. This allows multi-core debug support of the network services provider 100.

A Schedule/Sync and Order (SSO) module 148 queues and schedules work for the processor cores 120. Work is queued by adding a work queue entry to a queue. For example, a work queue entry is added by the packet input unit 126 for each packet arrival. A timer unit 150 is used to schedule work for the processor cores 120.

Processor cores 120 request work from the SSO module 148. The SSO module 148 selects (i.e., schedules) work for one of the processor cores 120 and returns a pointer to the work queue entry describing the work to the processor core 120.

The processor core 120, in turn, includes instruction cache 152, Level-1 data cache 154, and crypto-acceleration 156. In one embodiment, the network services processor 100 includes 32 superscalar Reduced Instruction Set Computer (RISC)-type processor cores 120. In some embodiments, each of the superscalar RISC-type processor cores 120 includes an extension of the MIPS64 version 3 processor core. In one embodiment, each of the superscalar RISC-type processor cores 120 includes a cnMIPS II processor core.

Level-2 cache memory 130 and external DRAM 108 are shared by all of the processor cores 120 and I/O co-processor devices. Each processor core 120 is coupled to the Level-2 cache memory 130 by the CMI 144. The CMI 144 is a communication channel for all memory and I/O transactions between the processor cores 100, the I/O interface 136 and the Level-2 cache memory 130 and controller. In one embodiment, the CMI 144 is scalable to 32 processor cores 120, supporting fully-coherent Level-1 data caches 154 with write through. Preferably the CMI 144 is highly-buffered with the ability to prioritize I/O. The CMI is coupled to a trace control unit 164 configured capture bus request so software can later read the request and generate a trace of the sequence of events on the CMI.

The Level-2 cache memory controller 131 maintains memory reference coherence. It returns the latest copy of a block for every fill request, whether the block is stored in Level-2 cache memory 130, in external DRAM 108, or is "in-flight." It also stores a duplicate copy of the tags for the data cache 154 in each processor core 120. It compares the addresses of cache-block-store requests against the data-cache tags, and invalidates (both copies) a data-cache tag for a processor core 120 whenever a store instruction is from another processor core or from an I/O component via the I/O interface 136.

In some embodiments, a plurality of DRAM controllers 133 supports up to 128 gigabytes of DRAM. In one embodiment, the plurality of DRAM controllers includes four DRAM controllers, each of the DRAM controllers supporting 32 gigabytes of DRAM. Preferably, each DRAM controller 133 supports a 64-bit interface to DRAM 108. Additionally, the DRAM controller 133 can supports preferred protocols, such as the DDR-III protocol.

After a packet has been processed by the processor cores 120, the packet output unit 146 reads the packet data from the Level-2 cache memory 130, 108, performs L4 network protocol post-processing (e.g., generates a TCP/UDP checksum), forwards the packet through the interface units 122 or the PCI interface 124 and frees the L2 cache memory 130/DRAM 108 used by the packet.

The DRAM Controllers 133 manages in-flight transactions (loads/stores) to/from the DRAM 108. In some embodiments, the DRAM Controllers 133 include four DRAM controllers, the DRAM 108 includes four DRAM memories, and each DRAM controller is connected to a DRAM memory. The DFA unit 160 is coupled directly to the DRAM Controllers 133 on a bypass-cache access path 135. The bypass-cache access path 135 allows the HFA Unit to read directly from the memory without using the Level-2 cache memory 130, which can improve efficiency for HFA operations.

The network services processor 100 may be implemented in a system on chip (SOC), by integrating all components of the processor 100 within a single substrate. For applications requiring higher processing capacity, multiple SOCs may be interconnected through a common interconnect as described below with reference to FIG. 2, where each SOC includes one or more network services processor 100 as shown in FIG. 1. The interconnect may be referred to as a SOC coherent interconnect (SCI), and may enable processor-to-processor communications for operations such as parallel processing and shared cache or memory access. To enable communications between the SOCs, the network services processor 100 may include a SOC coherent interconnect (SCI) interface 185. The SCI interface 185 may connect to the CMI 144 to send and receive messages, such as memory requests/responses and work requests/responses, with the processing cores 120 and the L2C 130. Operation of the SCI interface, as well as the SCI interconnect within a multiple-SOC system, are described in further detail below with reference to FIGS. 2-10.

Figure 2:
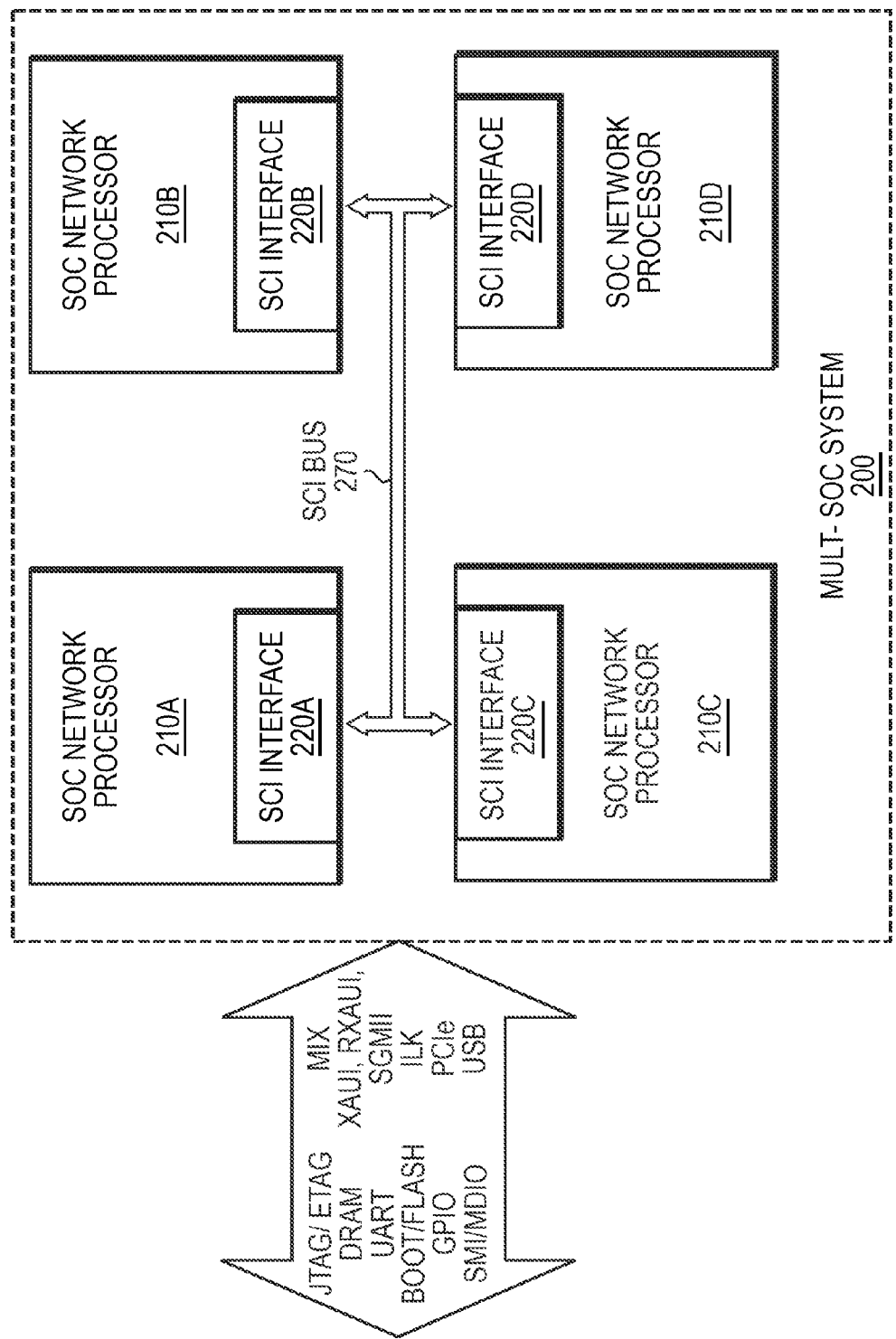
FIG. 2 is a block diagram of a network processing system including a plurality of interconnected SOCs.

FIG. 2 is a block diagram of a network processing system 200 including a plurality of interconnected SOCs 210A-D. Each of the SOCs 210A-D may include a network processor such as the processor 100 described above with reference to FIG. 1, including a respective SCI interface 220A-D.

The network processing system 200 may be configured to be addressable as a single SOC having multiple network processors, which in turn may be addressable as a single network processor. Thus, the system 200 may interface with external elements in a manner similar to the network processor 100 described above. To provide this capability, the system 200 may include an interface to route external communications to the respective ports at each of the network processors 210A-D.

Further, to provide coherence among the network processors 210A-D, the network processors 210A-D may be linked by a common SCI interconnect 270 at each respective SCI interface 220A-D. The SCI interconnect 270 may include a bus, series of point-to-point connections, or other combination of channels. The SCI interfaces 220A-D communicate with one another to send and receive messages, such as memory requests/responses and work requests/responses, thereby providing coherence across the network processors 210A-D.

The SCI interfaces 220A-D communicate with one another via a protocol described in example embodiments below, referred to as the SCI protocol. In the examples below, the SCI protocol may be a link-layer, point-to-point protocol that provides for the reliable transmission of multi-core interconnect messages between SOCs, also referred to as nodes. The multicore interconnect messages may be assigned to logical ("virtual") channels based on a type or class of the message. A substantial number of channels (e.g., 15) enables greater precision in organizing messages and controlling traffic. Messages sent on the same channel may be ordered, while those sent on different channels may be reordered depending on a priority or other configuration.

The messages (also referred to as "data messages") may be delineated into fixed-size (e.g., 8-byte) words and are packed into fixed-size data blocks (e.g., 64-bytes). For an embodiment implementing 8-byte words and 64-byte data blocks, each data block may contain up to 7 words of data and an 8-byte control word. The control word may be used to specify the block type as well as the form of the control word. Data blocks that contain valid data words may be assigned a sequence number and stored in a retry buffer until the remote link partner returns an acknowledgement. In the event of an error, retransmission may include all blocks newer than the failing sequence number. During transmission, the data block may be striped across a configurable number of physical ports ("lanes") for transmission via the SCI interconnect 270.

Figure 3:
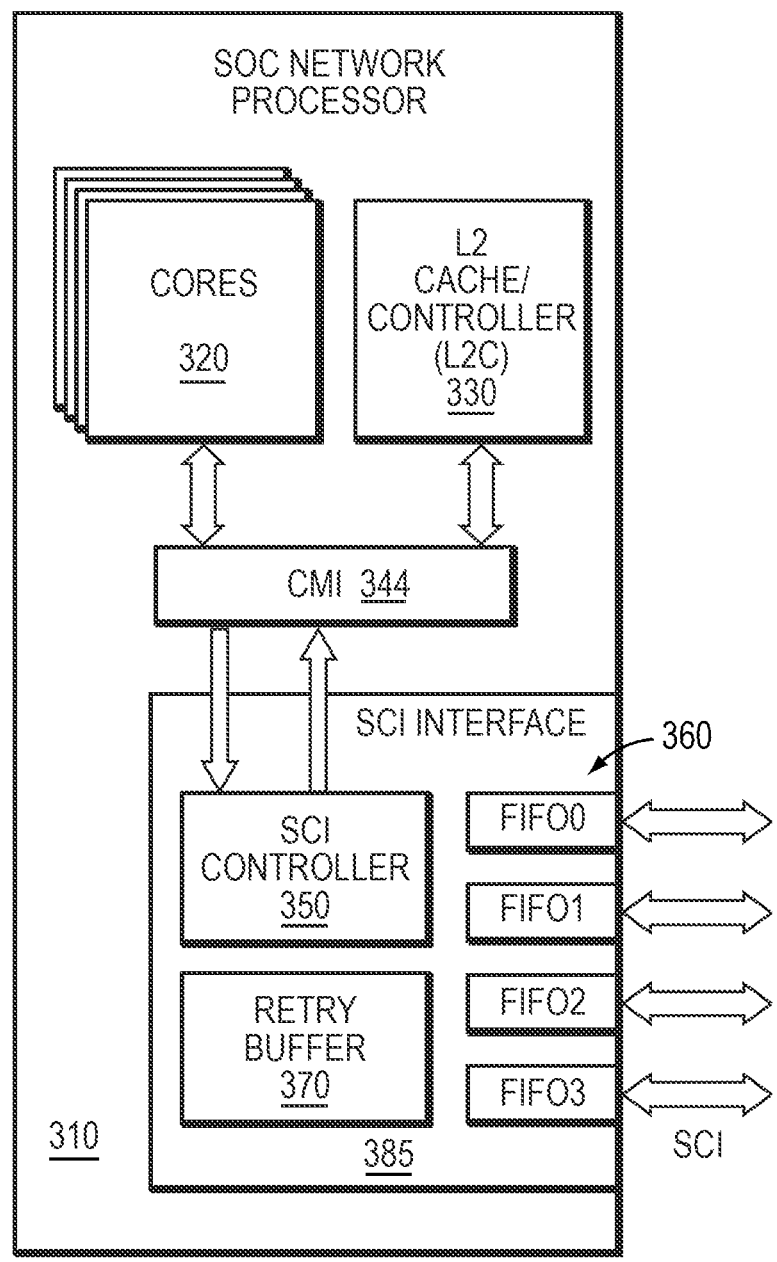
FIG. 3 is a block diagram of an SOC including a SOC coherent interconnect (SCI) interface.

FIG. 3 is a block diagram of an SOC 310, including a SCI interface 385 in further detail. The SOC 310 may be configured to include some or all of the elements of the network processor 100 described above with reference to FIG. 1, and may further be configured within a multiple-SOC system such as the system 200 described above with reference to FIG. 2. The SCI interface 385 may connect to the CMI 344 to send and receive messages, such as memory requests/responses and work requests/responses, with the processing cores 320 and the L2C 330. For transmission to external SOCs via the SCI, the SCI interface 385 may include a SCI controller 350, retry buffer 370, and output ports 360 including respective first-in-first-out (FIFO) buffers. The SCI controller 530 may interface with the cores 320 and L2C 330 to exchange messages, and operates to classify outgoing data messages by channels, form data blocks comprising those data messages, and transmit the data blocks via the output ports. Transmitted data blocks may also be stored to the retry buffer 370 until receipt of the data block is acknowledged by the receiver.

In this example embodiment, the SCI interface 385 is configured for transmission of data across the SCI interconnect. In order to receive SCI communications, the SOC may include an additional SCI interface (not shown), which may be configured in a manner similar to the SCI interface 385, with modifications as understood in the art. In particular, a receiving SCI interface may omit a retry buffer, and may include receiver ports in place of output ports. The SCI interface 385 may be configured to have receiver ports in addition to the output ports 360, where the SCI controller 350 may be configured to process received data blocks and forward corresponding data messages to the processing cores 320 and/or the L2 cache/controller 330.

Figure 4:
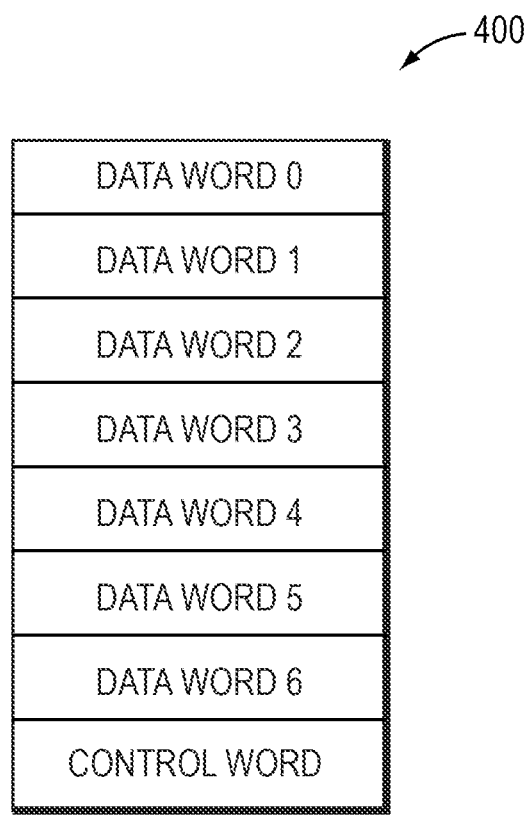
FIG. 4 is a block diagram of an example data block format.

FIG. 4 is a block diagram of an example data block 400. In an example embodiment as described above, outgoing data messages may be delineated into fixed-size (e.g., 8-byte) words and are packed into fixed-size data blocks (e.g., 64-bytes). For an embodiment implementing 8-byte words and 64-byte data blocks, each data block 400 may contain up to 7 words of data (DATAWORD 0-DATA-WORD 6) and an 8-byte control word (CONTROL WORD). The control word may be used to specify the block type as well as the form of the control word. The SCI interface (e.g., SCI interface 385 in FIG. 3) may generate the data block 400 to include data words according to a predetermined configuration, for example by assigning each data word slot to a given virtual channel.

The data block 400 illustrates a general data block format. In example embodiments, the SCI interface may generate a number of different types of data blocks each having a particular application and format. In example SCI communications described below, four different block formats may be employed, namely sync (FIG. 6), idle (FIG. 7), data with credits (FIG. 8) and data with poison (FIG. 9). The block formats may be distinguished by an indicator, "block type field" included in the respective control word. While all blocks may contain the same number of data words, the validity of the data words can be specified in the control word.

Before describing the particular block formats and their applications, block formation is first described below with reference to FIGS. 5A-C.

Figure 5A:
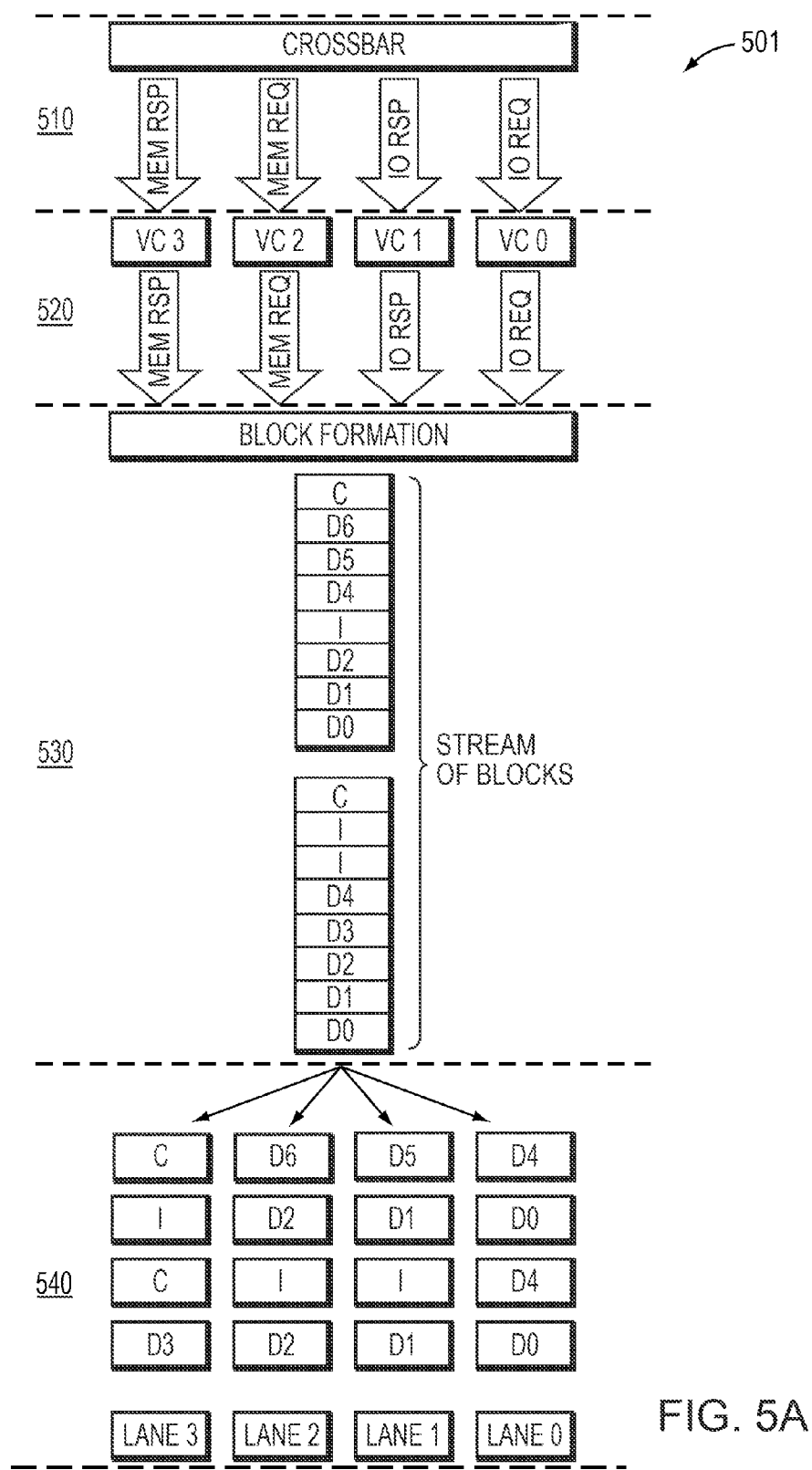
FIG. 5A is a flow diagram illustrating a process of transmitting data according to a SCI protocol.

FIG. 5A is a flow diagram illustrating a process 501 of forming and transmitting data blocks according to an example SCI protocol. The process 501 may be performed by an SCI interface such as the SCI interface 385 described above with reference to FIG. 3. With reference to FIG. 3, a SCI controller 350 receives data messages from the processor cores 320 and/or L2 cache/controller 330 via the CMI crossbar 344 (510). The data messages may be of a number of different types, such as I/O requests and responses (e.g., inter-SOC work requests and responses) and memory requests and responses (e.g., inter-SOC cache or memory accesses). The data messages may be of any size, as they can be segmented into a number of data words for transmission. The SCI controller 350 may be configured to enable a number of virtual channels (e.g., VC0-VC3), where each virtual channel is associated with a specific type of data message. In the example shown in FIG. 3, I/O requests are assigned to VC0, I/O responses are assigned to VC1, memory requests are assigned to VC2, and memory responses are assigned to VC3. In further embodiments, virtual channels may be configured in addition to, or in place of, such channels, including virtual channels assigned to more specific types of work or memory requests/responses, and virtual channels assigned to specific processing cores. Accordingly, the SCI controller classifies each data message by type, assigning each message to a corresponding virtual channel (520).

The SCI controller 350 then proceeds to generate a stream of data blocks from the data messages at each virtual channel (530). Each data block may have one or more slots available for data words at each of the virtual channels. Alternatively, if the number of virtual channels exceed the number of data word slots in each data block, the SCI interface may select the virtual channels receiving data word slots from data block to data block. (Such a configuration is described below with reference to FIG. 8.) Because a data message may be larger than a data word, the data message can be segmented into several data words for distribution among several data blocks. Once the data blocks are formed, the SCI controller 350 forwards the data blocks to a number of output ports 360 for transmission to another SOC (540). The SCI controller may stripe each data block across the output ports, specifically by distributing individual data words (or other division of the data block) across the output ports in a cyclical order. By striping the data blocks across the output ports, transmission speed may be increased over serial transmission. Further, by generating and transmitting data blocks as described above, the SCI interface 385 may effectively control communications traffic with precision among different message types, as well as prevent interference among competing data messages.

Conversely, when receiving data blocks from a remote SOC, the SCI interface may operate the process 501 in reverse order, with modifications as understood in the art.

Figures 5B, 5C:
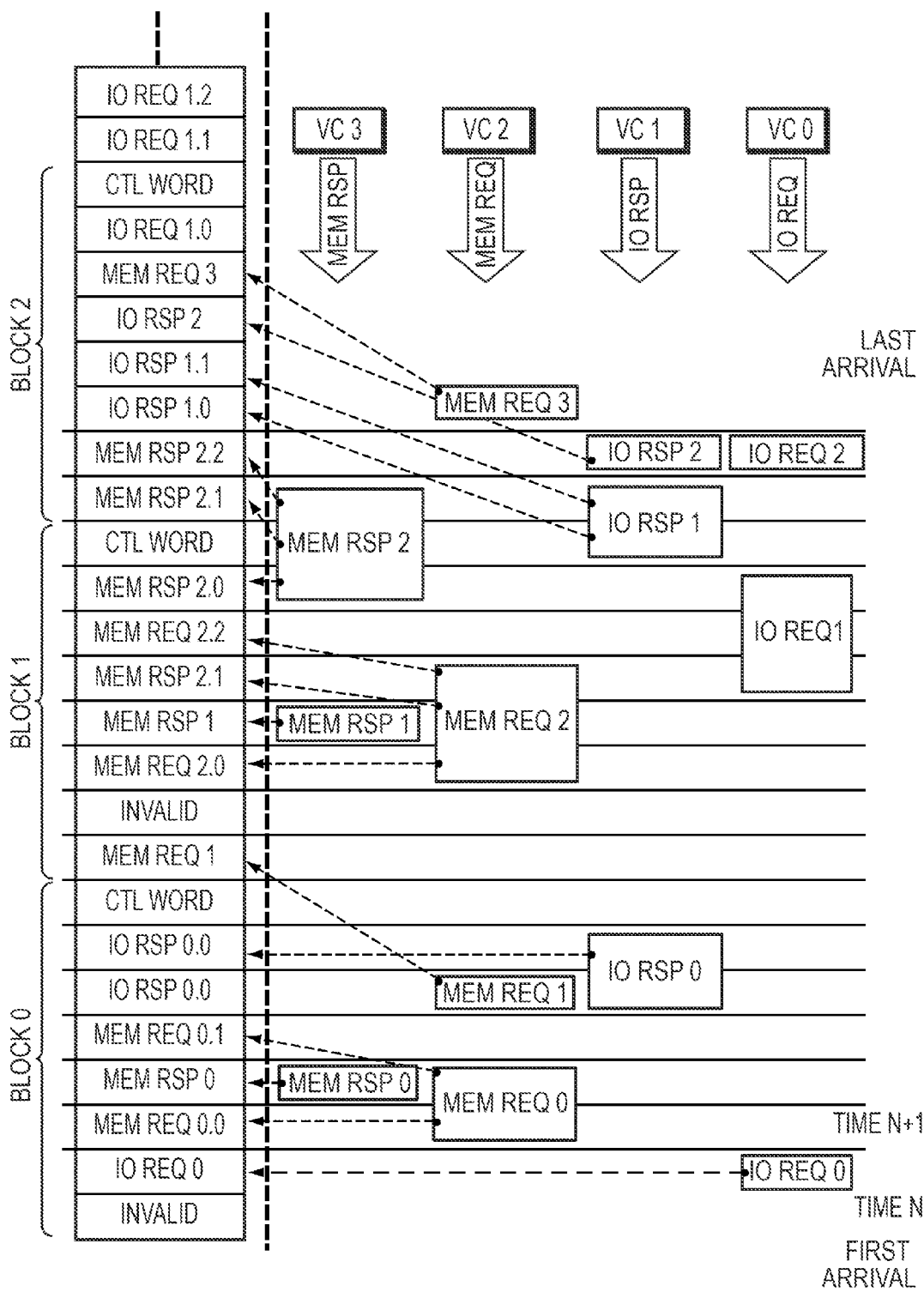
FIG. 5B is a timing diagram illustrating receipt of data at a plurality of virtual channels.
FIG. 5C is a diagram of a series of data blocks formed of the data of FIG. 5B.

FIGS. 5B and 5C show an example data block formation from a set of data messages received to a SCI interface. FIG. 5B is a timing diagram illustrating receipt of data messages at a plurality of virtual channels, while FIG. 5C is a diagram of a series of data blocks formed of the data messages of FIG. 5B. As shown in FIG. 5B, data messages of each type can be received to the SCI interface at any time from time N onward. Those data messages can be processed and assigned to virtual channels as described above with reference to FIG. 5A. Once received and assigned a virtual channel, the data messages may enter a per-virtual channel queue and are inserted into a data block based on their place in the respective queue. Although the ordering shown in based on priority, alternative ordering methods, such as per-channel slot reservation or round-robin, may be implemented. In such a method, ordering may also be based on the availability of data word slots for the respective virtual channel.

As shown in FIG. 5C, the data messages are segmented into individual words and formed into data blocks (BLOCK0-BLOCK2). To optimize throughput, the SCI interface may be configured to transmit the data blocks as a continuous stream. To transmit in this manner, the SCI interface may generate data blocks with empty ("invalid") data words in the event that there are no pending data messages in the virtual channel for the given data word slot. For example, BLOCK1 includes an "invalid" data word in a slot due to an insufficient number of data words in the VC3 queue at the time of block formation. Alternatively, the SCI interface may configure the data words of each block dynamically based on the occupancy at each virtual channel queue, thereby minimizing the number of invalid words placed within each data block. In such a configuration, rather than employing predetermined slot assignments, the control word of each block may be configured to identify the virtual channel corresponding to each data word in the block. However, invalid words may still be included if no data messages are available at any virtual channel queue at the time of block formation.

As further illustrated in FIG. 5C, data messages can be segmented into several discrete data words for transmission in a plurality of data blocks. For example, the data message "MEM Rsp 2" in VC3 is larger than a data word, and therefore is divided into multiple data words, "MEM Rsp 2.0," "MEM Rsp 2.1" and "MEM Rsp 2.2," which are then distributed to data blocks BLOCK1 and BLOCK2.

Figure 8:
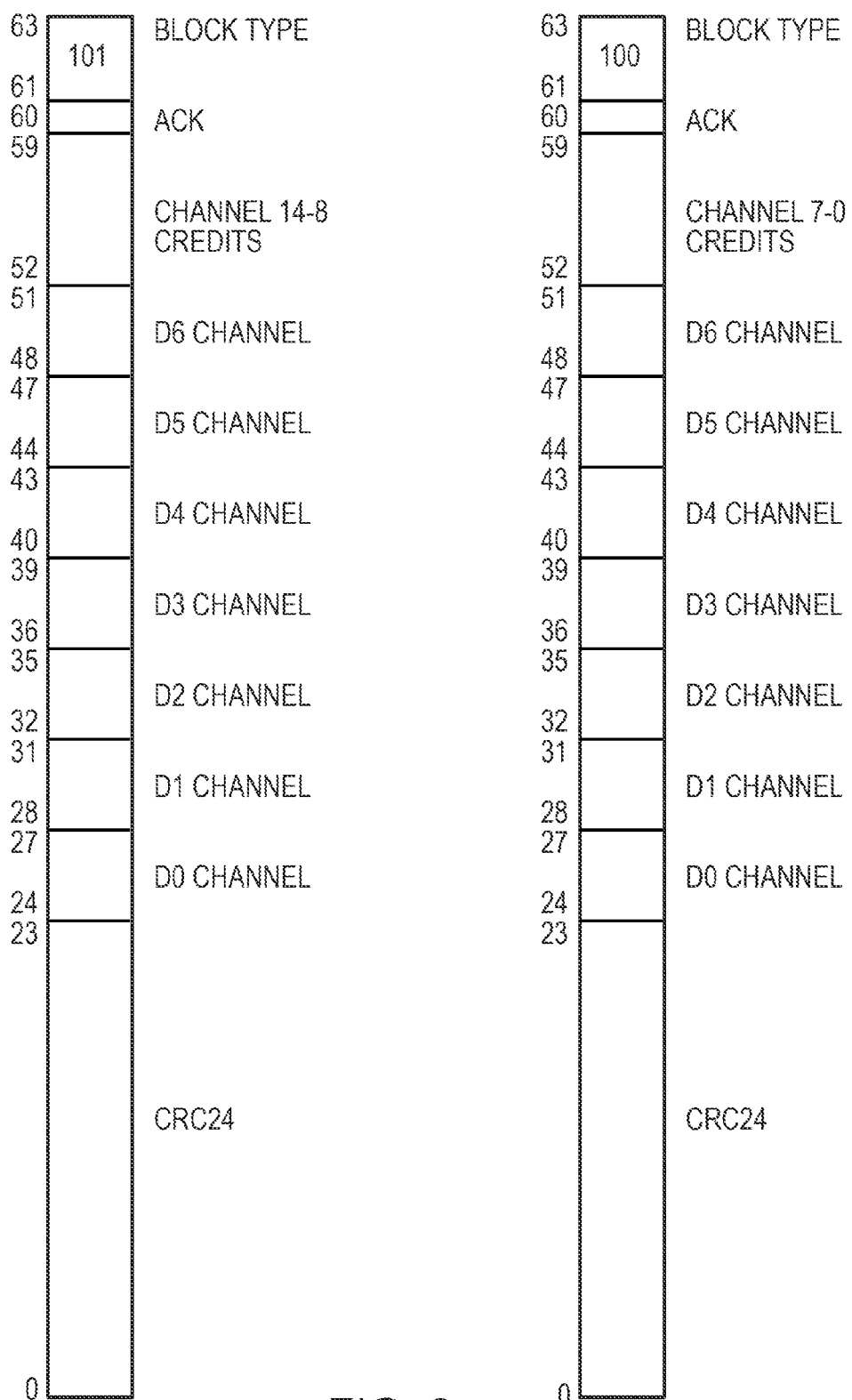
FIG. 8 is a diagram of data block with credit control words.
Figure 9:
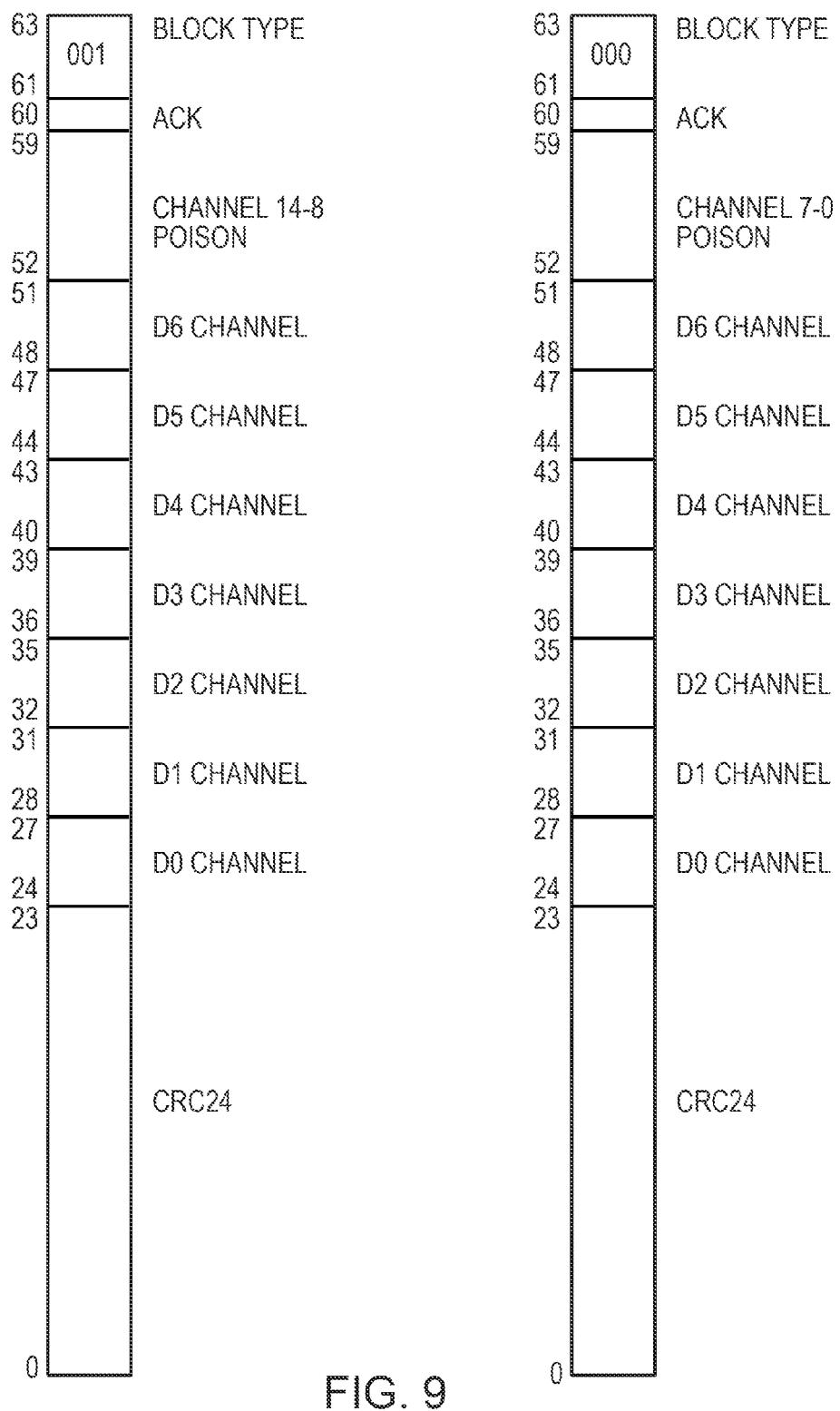
FIG. 9 is a diagram of data block with poison control words.
Figure 10:
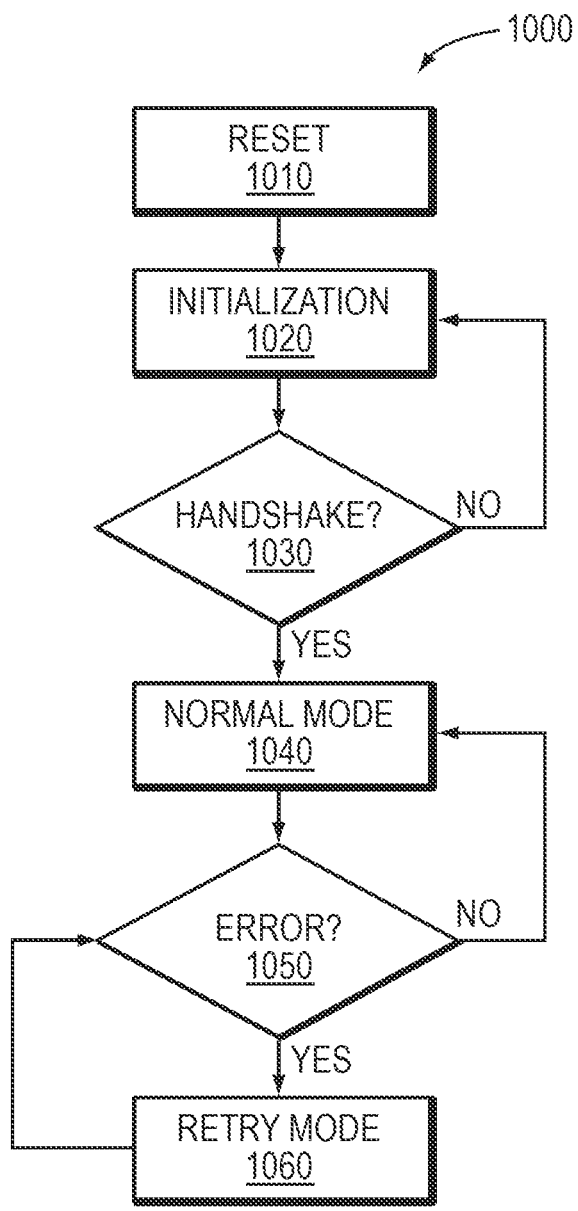
FIG. 10 is a state diagram of operation modes under a SOC coherent interconnect (SCI) protocol in one embodiment.

FIGS. 6-9 illustrate example data block formats, each of which may be employed in SCI communications in an example embodiment. FIG. 10 illustrates an SCI communications process by which each of the data block of FIGS. 6-9 may be implemented.

Figure 6:
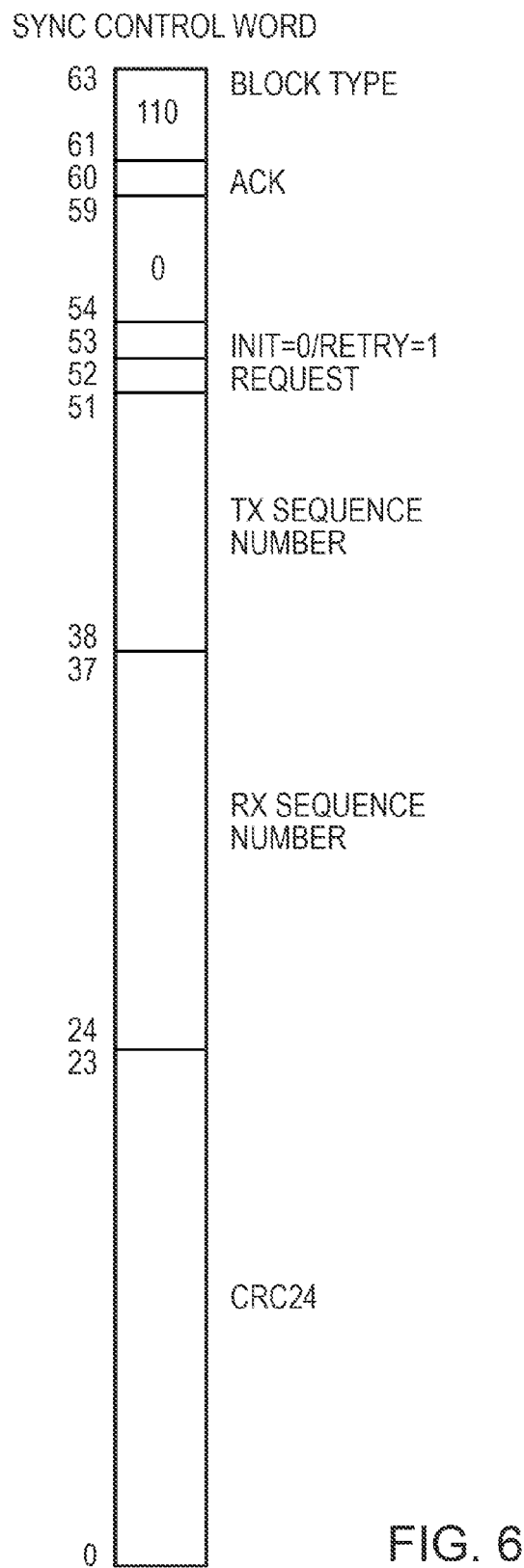
FIG. 6 is a diagram of a synchronization block control word.

FIG. 6 is a diagram of an example synchronization block ("sync block") control word. Sync blocks may not contain valid data words or credits, and consequently may not be assigned a sequence number and are not written to the retry buffer. Sync blocks may be used to perform retry handshakes and initialization handshakes between the link partners. A description of each field in the synchronization block is provided in the table below:

TABLE 1

Example control word fields of a synchronization block.

| Bit Position | Field Name | Field Description |
| --- | --- | --- |
| 63:61 | Block type | Sync block indicated by "110" |
| 60 | ACK | Acknowledge handshake request. |
| 59:54 | 0 | Zero. |
| 53 | Init = 0/ Retry = 1 | Indicate retry or initialization handshake. |
| 52 | Request | Indicates handshake request. |
| 51:38 | TX Sequence Number | Indicates the sequence number that will be assigned to the next TX data block. Used for verification by the receiver. |
| 37:24 | RX Sequence Number | Indicates the sequence number that will be assigned to the next RX data block. Used for verification by the receiver. |
| 23:0 | CRC24 | A CRC error check that covers the entire data block, including the control word with a zero-filled CRC24 field. |

Figure 7:
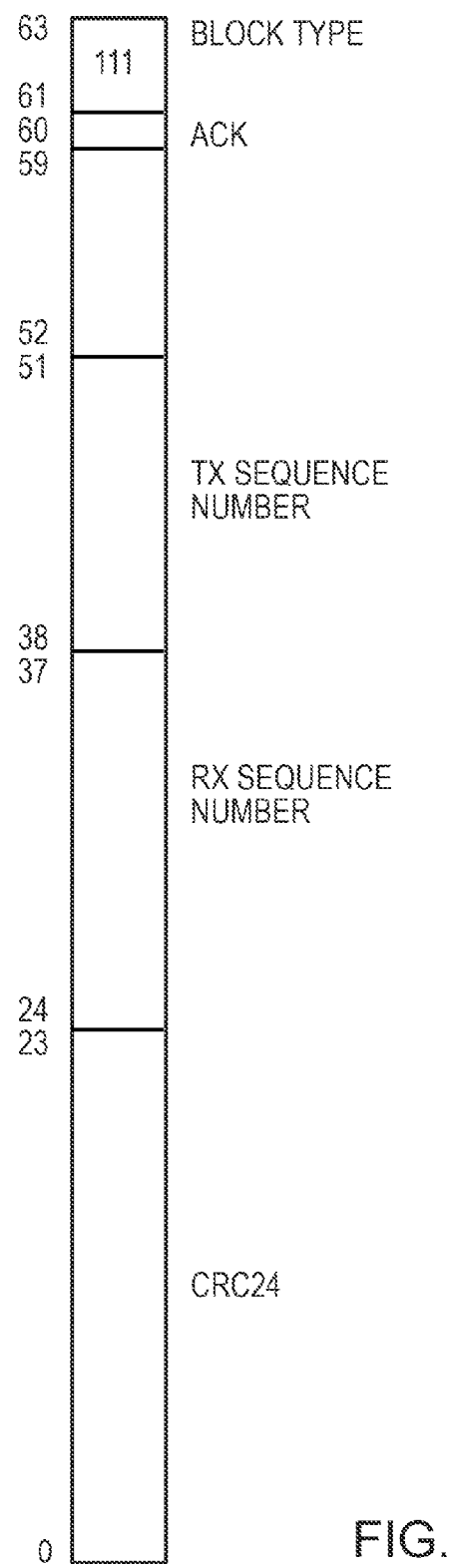
FIG. 7 is a diagram of an idle block control word.

FIG. 7 is a diagram of an example an idle block control word. Idle blocks may not contain valid data words or credits. Consequently, idle blocks may not be assigned a sequence number and may not be written to the retry buffer. However, idle blocks may return block acknowledgements (ACKs). Idle blocks may be sent whenever a SCI interface is not performing a retry/init handshake and either no channel data is ready to be transmitted or no channel credits are ready to be returned.

TABLE 2

Example control word fields of an idle block.

| Bit Position | Field Name | Field Description |
| --- | --- | --- |
| 63:61 | Block type | Idle block indicated by "111" |
| 60 | ACK | Acknowledge 2 blocks correctly received. |
| 59:52 | 0 | |
| 51:38 | TX Sequence Number | Indicates the sequence number that will be assigned to the next TX data block. Used for verification by the receiver. |
| 37:24 | RX Sequence Number | Indicates the sequence number that will be assigned to the next RX data block. Used for verification by the receiver. |
| 23:0 | CRC24 | A CRC error check that covers the entire data block, including the control word with a zero-filled CRC24 field. |

FIG. 8 is a diagram of data block with credit control words. DATA blocks must contain at least one valid data word or channel credits. DATA blocks are assigned consecutive sequence numbers and are written to the retry buffer. DATA blocks may return ACKs, but the ACKs must not be resent during a retry. Therefore, DATA blocks should be written to the retry buffer with ACK=0. ACK insertion should be performed after the retry buffer but before the CRC24 calculation.

TABLE 3

Example control word fields of data block with credits.

| Bit Position | Field Name | Field Description |
| --- | --- | --- |
| 63:61 | Block type | "101" indicates a data block with credits for virtual channels 14-8. "100" indicates a data block with credits for virtual channels 7-0. |
| 60 | ACK | Acknowledge 2 blocks correctly received. |
| 59:52 | Channel Credits | Each bit returns 8 credits for a single channel. |
| 51:48 | D6 Channel | Channel for data word 6. |
| 47:44 | D5 Channel | Channel for data word 5. |
| 43:40 | D4 Channel | Channel for data word 4. |
| 39:36 | D3 Channel | Channel for data word 3. |
| 35:32 | D2 Channel | Channel for data word 2. |
| 31:28 | D1 Channel | Channel for data word 1. |
| 27:24 | D0 Channel | Channel for data word 0. |
| 23:0 | CRC24 | A CRC error check that covers the entire data block, including the control word with a zero-filled CRC24 field. |

FIG. 9 is a diagram of data blocks with poison control words. DATA blocks must contain at least one valid data word with an unrecoverable error. An example of such an error would be a double-bit error on the message coming from the local multi-core interconnect unit. The channel poison field will be used to carry the error to the remote link partner.

DATA blocks are assigned consecutive sequence numbers and are written to the retry buffer. DATA blocks may return ACKs, but the ACKs must not be resent. Therefore, DATA blocks should be written to the retry buffer with ACK=0. ACK insertion should be performed after the retry buffer but before the CRC24 calculation.

TABLE 4

Example control word fields of data block with poison.

| Bit Position | Field Name | Field Description |
| --- | --- | --- |
| 63:61 | Block type | "001" indicates a data block with credits for virtual channels 14-8. "000" indicates a data block with poison for virtual channels 7-0. |
| 60 | ACK | Acknowledge 2 blocks correctly received. |
| 59:52 | Poison | Each bit indicates poison to the current message for the respective channel. |
| 51:48 | D6 Channel | Channel for data word 6. |
| 47:44 | D5 Channel | Channel for data word 5. |
| 43:40 | D4 Channel | Channel for data word 4. |

TABLE 4-continued

Example control word fields of data block with poison.

| Bit Position | Field Name | Field Description |
|---|---|---|
| 39:36 | D3 Channel | Channel for data word 3. |
| 35:32 | D2 Channel | Channel for data word 2. |
| 31:28 | D1 Channel | Channel for data word 1. |
| 27:24 | D0 Channel | Channel for data word 0. |
| 23:0 | CRC24 | A CRC error check that covers the entire data block, including the control word with a zero-filled CRC24 field. |

FIG. 10 is a state diagram illustrating a method 1000 of operating SCI communications at a SCI interface, also referred to as a host. The example SCI interfaces described above with reference to FIGS. 1-3 and 5A-C may be configured to operate this method 1000. Further, the data blocks implemented in the method may include data blocks configured as described above with reference to FIGS. 4 and 6-9.

Following a reset of a SCI interface (1010), the SCI interface may enter an initialization mode prior to sending and receiving data blocks (1020). The initialization state is entered to verify that the SCI interface and receiver are synchronized and able to send and receive data blocks. During initialization mode, a SCI interface may continuously send sync blocks. With reference to the sync block of FIG. 6, the request/ACK bit may be used to perform a 3-way handshake, whereby the SCI interface manages the request/ACK bits of a continuously sends stream of sync blocks for the purpose of establishing the variables of Table 5 prior to transmission of data blocks. An initialization handshake may be designated a higher priority than a retry handshake. During the initialization mode, SCI interfaces synchronize their starting state by setting respective variables to common values. An example set of variable, and their initial values, are provided in the table below.

mode may be exited whenever a block is received with an error, the link goes down, the node is reset, or a sync block is received.

A number of conditions may be required before a SCI interface may form and send a new data block. A first condition is that the SCI interface be in normal operation mode. A second condition is that TX_X_RETRY_FULL be 0. A third condition is that the SCI interface have either channel credits to return or channel data ready to send. In order for channel data to be considered ready to send, the SCI interface may be required to have the necessary channel credits as indicated by TX_X_CREDITS[channel]. It may not be required that a newly formed data block contain 7 valid data words, or that a newly formed data block contain data words from a single channel. However, it may be required that the newly formed block contain either at least one data word or the return of RX per-channel credits.

When the SCI interface forms and sends a new data block, the SCI interface increments TX_X_SEQ_NUM and writes the data block into the retry buffer at the entry corresponding to the sequence number. In addition, if TX_X_SEQ_NUM equals TX_X_ACK_SEQ_NUM, the SCI interface will set TX_X_RETRY_FULL=1.

Whenever the SCI interface correctly receives a data block that contains an ACK or an idle block that contains an ACK while in normal operation mode, the SCI interface may increment TX_X_ACK_SEQ_NUM twice. Each ACK may acknowledge up to two blocks as being received.

When data is unloaded from one of the per-channel RX data FIFOs, the respective per-channel credits counter RX_X_CREDITS is incremented. This incrementing continues during the retry mode. The SCI interface returns the credits to the remote link partner in groups of 8. Any given RX_X_CREDITS counter is decremented by 8 whenever the SCI interface sends a 'DATA /w Credits' block with the respective channel credit bit set.

When a data block is correctly received, RX_X_ACK_CNT may be incremented. This incrementing can continue during the retry mode after the retry handshake completes. RX_X_ACK_CNT may be cleared during a retry or initialization handshake. When a data block is correctly received, TX_X_ACK_SEQ_NUM may also be incremented. This

TABLE 5

SCI variables and respective initial values upon initialization.

| Item | Initial value | Description |
|---|---|---|
| TX_X_SEQ_NUM | 0 | Sequence number assigned to the next newly formed data block. Used as block write address into retry buffer. |
| TX_X_ACK_SEQ_NUM | 0 | Sequence number of the oldest block which has not been acknowledged. |
| TX_X_RETRY_FULL | 0 | Indicates the retry buffer has no room to store a newly formed data block. |
| TX_X_CREDITS(0 . . . 14) | 0 | Per-channel TX credits. One TX channel credit allows a host to sends one 8-byte data word for the respective channel. Credits are replenished by the correct reception of data blocks containing TX credits. |
| RX_X_CREDITS(0 . . . 14) | ALL | Per-channel RX credits, reflecting the number of credits that are scheduled to be returned to the remote link partner. The initial value of each counter should watch the depth of the respective RX fifo. |
| RX_X_SEQ_NUM | 0 | Sequence number assigned to the next correctly received data block. During retry mode, given to remote link partner to indicate where to begin resending blocks. |
| TX_X_RET_SEQ_NUM | 0 | Sequence number of next data block sent during retry mode. Used as a block read addres into the retry buffer. Seeded by the RX sequence number field received during a retry handshake. |
| RX_X_ACK_CNT | 0 | Incremented when a data block is correctly received. Decremented twice when data block sent with ACK = 1. Cleared during a retry or initialization handshake. |

At the completion of a successful initialization handshake (1030), the SCI interface switches to normal operating mode (1040). Normal operation mode may be entered upon the exit of initialization mode or the exit of retry mode. Normal incrementing may also continue during the retry mode after the retry handshake completes. TX_X_ACK_SEQ_NUM may be set to RX_X_SEQ_NUM and is cleared during a retry or initialization handshake.

In the event of an error (1050), the SCI interface may enter the retry mode (1060). Retry mode may be entered whenever a block is received with an error, the link goes down, or a SYNC block is received with init/retry=1, Request=1. During the retry mode, the SCI interface may begin sending SYNC block with init/retry=1.

The request/ACK bit may be used to perform a 3-way handshake in the retry mode. During the retry handshake, the SCI interface X may insert RX_X_SEQ_NUM into the RX sequence number field of all transmitted sync blocks. The SCI interface may use the RX sequence number field of received sync blocks to initialize TX_X_RET_SEQ_NUM. In addition, the SCI interface may clear RX_X_ACK_CNT.

Upon the completion of the retry handshake, the SCI interface may begin resending data blocks read from the retry buffer starting at TX_X_RET_SEQ_NUM. Per-channel TX credits may not be required to send, as the corresponding TX credit counters were already decremented while forming the blocks. After reading the data block from the retry buffer, the ACK bit may be set if RX_X_ACK_CNT is >=2. When a retried data block is sent with the ACK bit set, RX_X_ACK_CNT may be decremented twice.

When a data block is resent, TX_X_RET_SEQ_NUM may be incremented. When TX_X_REQ_SEQ_NUM equals TX_X_SEQ_NUM, it is confirmed that blocks have been resent. Once all blocks have been resent and no outstanding error remains, the SCI interface may return to normal operating mode (1040). In the event that an error occur while resending blocks in the retry mode, the SCI interface may perform a retry handshake as when entering retry mode.

It should be understood that the example flow diagrams presented above can be readily converted to modules, subsystems, or systems that operate in a similar manner as set forth above. For example, the example embodiments may include an initialization module, computing module, and reporting module.

It should be further understood that the examples presented herein can include more or fewer components, be partitioned into subunits, or be implemented in different combinations. Moreover, the diagrams herein may be implemented in hardware, firmware, or software. If implemented in software, the software may be written in any suitable software language. The software may be embodied on any form of computer readable medium, such Random Access Memory (RAM), Read-Only Memory (ROM), or magnetic or optical disk, and loaded and executed by generic or custom processor(s).

While this invention has been particularly shown and described with references to example embodiments thereof, it will be understood by those skilled in the art that various changes in form and details may be made therein without departing from the scope of the invention encompassed by the appended claims.

What is claimed is:

1. A method comprising:
    generating a data message at a first system-on-chip (SOC) for transmission to a second SOC, the first and second SOCs each including a cache and a plurality of processing cores;
    associating the data message with one of a plurality of virtual channels;
    generating a data block to include data associated with each of the plurality of virtual channels, the data block including at least a portion of the data message;
    distributing segments of the data block across a plurality of output ports at the first SOC; and
    transmitting the data block to the second SOC via the plurality of output ports.

2. The method of claim 1, wherein the data block is one of a plurality of data blocks, and further comprising generating the plurality of data blocks each to include respective portions of the data message.

3. The method of claim 2, further comprising:
    distributing segments of the plurality of data block across the plurality of output ports; and
    transmitting the plurality of data block to the second SOC via the plurality of output ports.

4. The method of claim 1, wherein the data message is one of a plurality of data messages, and further comprising generating the data block to include at least a portion of each of the plurality of data messages.

5. The method of claim 1, wherein the data block is a first data block, and further comprising generating the first data block to include at least one segment storing an indicator to confirm that a second data block was received correctly at the first SOC from the second SOC.

6. The method of claim 1, further comprising maintaining a credit count for each of the plurality of virtual channels at the first SOC.

7. The method of claim 6, wherein the data block is a first data block, and further comprising, in response to receiving a second data block at the first SOC, incrementing the credit count of a respective one of the plurality of virtual channels.

8. The method of claim 6, further comprising:
    detecting the credit count at the first SOC for the virtual channel associated with the data block; wherein transmitting the data block is dependent upon the detecting.

9. The method of claim 6, further comprising generating the data block to include an indicator for incrementing at least one of the credit counts.

10. The method of claim 1, further comprising storing the data block to a retry buffer.

11. The method of claim 10, further comprising deleting the data block from the retry buffer upon receiving an acknowledge indicator from the second SOC.

12. The method of claim 10, further comprising, upon receiving an error indicator from the second SOC, retransmitting the data block to the second SOC.

13. The method of claim 1, further comprising generating the data block to include at least one field indicating an unrecoverable error.

14. The method of claim 1, further comprising:
    transmitting a first initialization block to the second SOC;
    receiving a response from the second SOC; and
    transmitting a second initialization block to the second SOC.

15. A system comprising:
    a first system-on-chip (SOC) including a first set of input/output (I/O) ports, a first cache, and a first plurality of processors, the first SOC configured to generate a data message associated with one of a plurality of virtual channels; and
    a second SOC including a second set of I/O ports, a second cache, and a second plurality of processors, each of the second set of I/O ports connected to a respective port of the first set of I/O ports via a bus; and
    the first SOC including an interface configured to 1) generate a data block to include data associated with each of the plurality of virtual channels, the data block including at least a portion of the data message, and 2) cause the data block to be transmitted from the first SOC to the second SOC via the first and second sets of I/O ports, the interface further configured to distribute segments of the data block across the first set of I/O ports.

16. The system of claim 15, wherein the data block is one of a plurality of data blocks, and wherein the interface is further configured to generate the plurality of data blocks each to include respective portions of the data message.

17. The system of claim 16, wherein the interface is further configured to 1) distribute segments of the plurality of data block across the plurality of output ports, and transmit the plurality of data block to the second SOC via the plurality of output ports.

18. The system of claim 15, wherein the data message is one of a plurality of data messages, and further comprising generating the data block to include at least a portion of each of the plurality of data messages.

19. The system of claim 15, wherein the interface is further configured to define a plurality of virtual channels associated with the first and second set of I/O ports, the data block being associated with at least one of the plurality of virtual channels.

20. The system of claim 19, wherein the interface is further configured to maintain a credit count for each of the plurality of virtual channels at each of the first and second sets of I/O ports.

21. The system of claim 20, wherein the interface is further configured to detect the credit count at the first set of I/O ports for the virtual channel associated with the data block, the interface causing the data block to be transmitted to the second cache based on the detection.

22. The system of claim 20, wherein the interface is further configured to generate the data block to include an indicator for incrementing at least one of the credit counts.

23. The system of claim 15, further comprising a retry buffer, wherein the interface is further configured to store the data block to the retry buffer.

24. The system of claim 23, wherein the interface is further configured to delete the data block from the retry buffer upon receiving an acknowledge indicator from the second set of ports.

25. The system of claim 23, wherein the interface is further configured, upon receiving an error indicator from the second set of ports, to retransmit the data block to the second set of I/O ports.

26. The system of claim 15, wherein the interface is further configured to transmit first and second initialization messages from the first set of I/O ports to the second set of I/O ports, the second initialization message being transmitted following a response message from the second set of I/O ports.

27. The system of claim 15, wherein the data block includes a field indicating an unrecoverable error.

28. The system of claim 15, wherein the data block is a first data block, and wherein the first data block includes at least one segment storing an indicator to confirm that a second data block was received correctly at the first set of I/O ports.

* * * * *